C. MACBETH.
TIRE FOR VEHICLE AND SIMILAR WHEELS.
APPLICATION FILED JUNE 9, 1914.
1,254,050.
Patented Jan. 22, 1918.
3 SHEETS—SHEET 1.
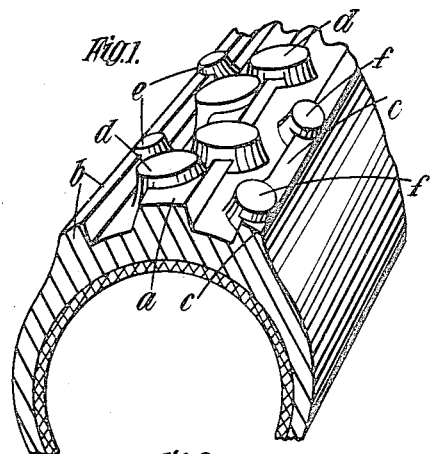
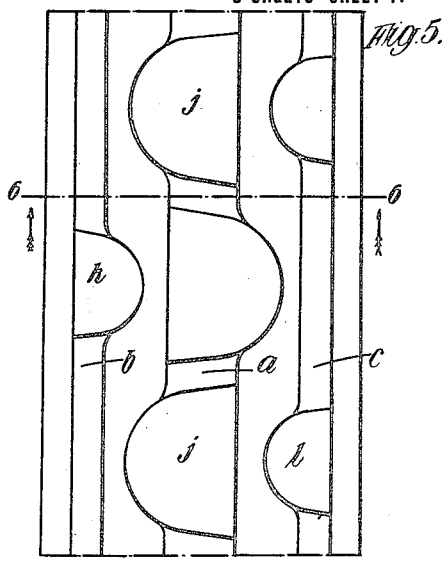
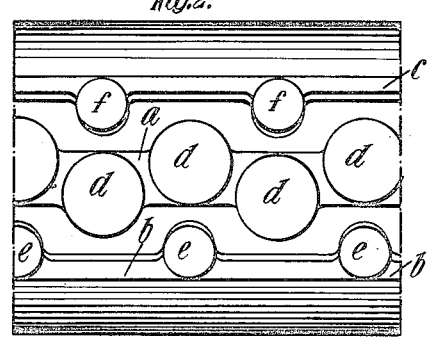
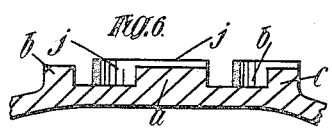
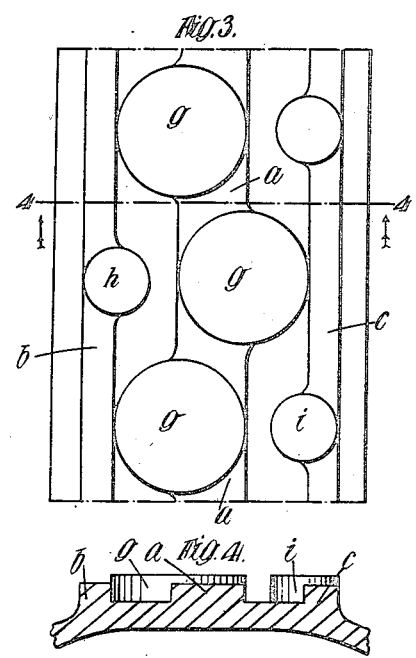
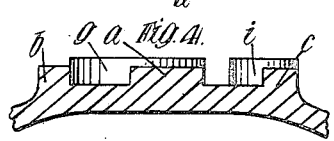
Witnesses:
Inventor:
Colin Macbeth

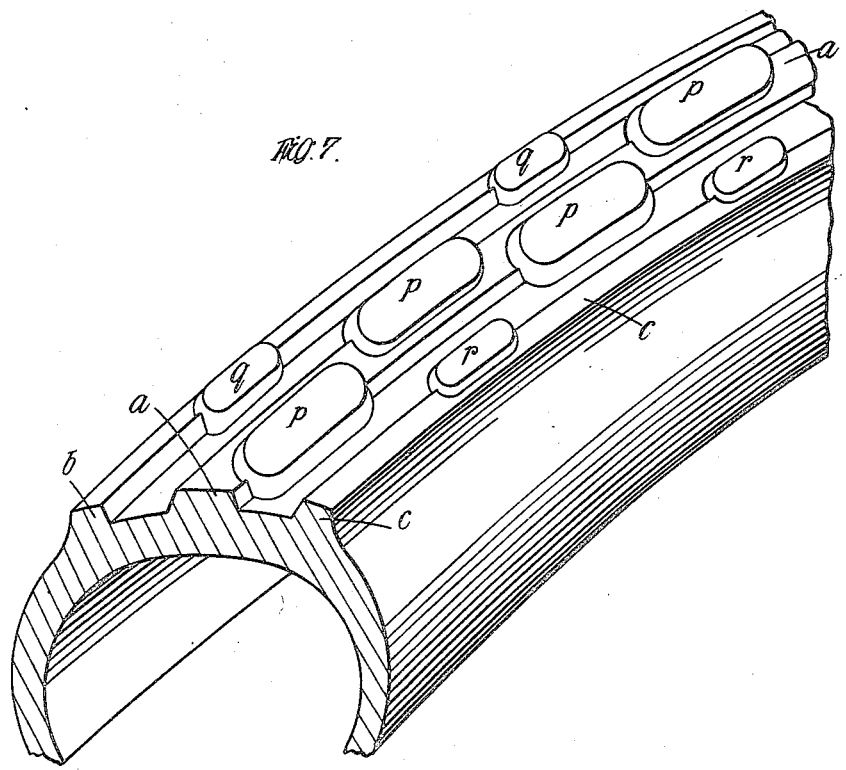
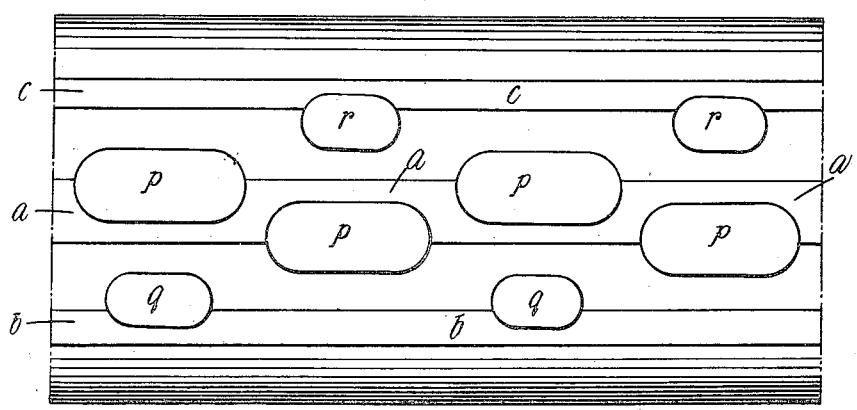

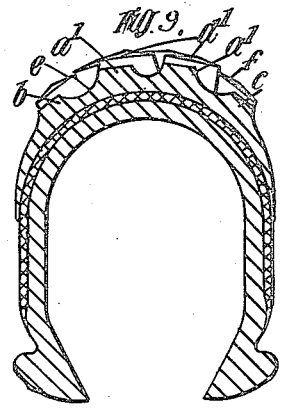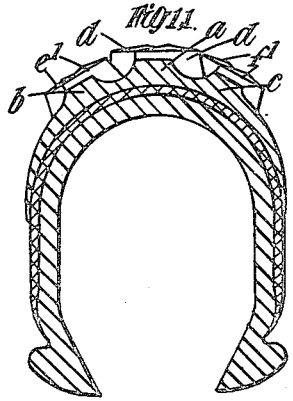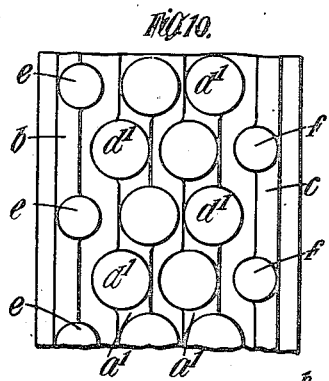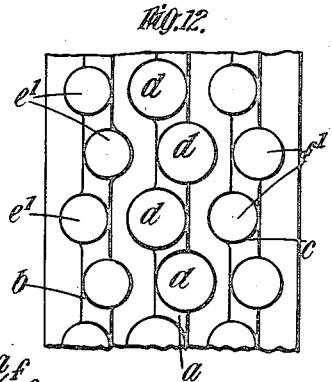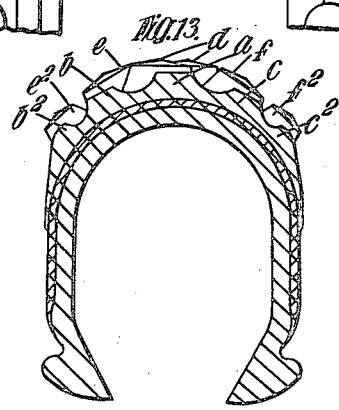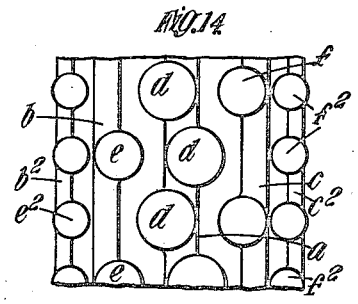

UNITED STATES PATENT OFFICE.

COLIN MACBETH, OF BIRMINGHAM, ENGLAND, ASSIGNOR TO THE DUNLOP RUBBER COMPANY, LIMITED, OF BIRMINGHAM, ENGLAND.

TIRE FOR VEHICLES AND SIMILAR WHEELS.

1,254,050.      Specification of Letters Patent.      Patented Jan. 22, 1918.

Application filed June 9, 1914. Serial No. 844,024.

*To all whom it may concern:*

Be it known that I, COLIN MACBETH, a subject of the King of Great Britain, residing at Manor Mills, Salford street, Aston Cross, Birmingham, in the county of Warwick, England, have invented certain new and useful Improvements in or Relating to Tires for Vehicle and Similar Wheels, of which the following is a specification.

This invention relates to tires for vehicle and similar wheels, of the kind which are provided with grooved or raised portions at the tread for the purpose of preventing skidding or slipping.

Heretofore such tires have usually been so formed or molded that the rubber is reduced in thickness throughout a considerable portion of the tread in order to provide the non-slipping or non-skidding surface the result being that the tread becomes rapidly worn and the non-slipping and non-skidding properties are soon lost.

The chief object of the present invention is to provide an effective non-slipping and non-skidding tire in which the rubber is so disposed that the wearing quality of the tread is not impaired and the non-slipping and non-skidding properties are preserved.

According to this invention the tire tread is formed with a central or intermediate circumferential rib (or more than one) of comparatively large area and thickness which constitutes the main wearing surface and when in use takes most of the load, the said rib or ribs also presenting irregular, zig-zag, sinuous or similarly formed walls or edges to prevent slipping and skidding. At a suitable distance from the central rib and on each side thereof one or more outer ribs are provided which support a comparatively small portion of the load under normal conditions but when the tire is subjected to abnormal load or shock they support an increased portion of the load. The side ribs may also present irregular or similarly formed walls or edges and are preferably smaller in area than the central rib. The irregular walls or edges of the central and outer ribs may be constituted by a series of laterally extending studs or upstanding projections which in some cases are raised above the outer or wearing surfaces of the ribs, the studs or the like on the outer ribs preferably extending into lateral depressions or spaces formed in the irregular walls or edges of the central rib.

In order that the said invention may be clearly understood and readily carried into effect the same will be described more fully with reference to the accompanying drawings in which:—

Figures 1 and 2 are respectively a sectional perspective view and a plan of the preferred form of the improved tire tread.

Figs. 3 and 4 are respectively a plan and cross sectional views of a modification.

Figs. 5 and 6 are views similar to Figs. 3 and 4 illustrating a further modification.

Figs. 7 and 8 are views similar to Figs. 1 and 2 also illustrating a modified arrangement.

Figs. 9, 10, 11, 12, 13 and 14 illustrate by means of cross sectional views and plans, three still further modifications.

Throughout the aforesaid figures, $a$ represents the central rib and $b$ $c$ indicate the outer ribs. In each case the central rib $a$ is substantially larger in cross sectional area than the outer ribs the outside walls or edges of which in the different examples shown, merge into the side walls or portions of the tire cover, see particularly Figs. 1 and 10. The irregular walls formed by the lateral extensions as aforesaid are provided on the two sides of the central rib while in most cases only the inner sides of the outer ribs are irregularly formed. Of course it will be understood that both walls of the outer ribs may be irregularly formed if desired. Referring to the modification illustrated in the sectional perspective view Fig. 1 and the plan view of Fig. 2, the irregular walls or lateral extensions of the central rib are formed by a series of staggered circular projections or studs $d$ which constitute part of the central rib and which extend on each side into the grooves or spaces between the central and outer ribs. The said projections or studs $d$ are shown raised above the upper or wearing surface of the central rib and are preferably arranged fairly close together, owing to the staggered arrangement there are alternate lateral extensions and spaces on each side of the central rib. The outer ribs $b$ $c$ are provided with circular projections or studs $e$ $f$ which are similar to but smaller than those on the central rib and they extend laterally into or toward the aforesaid lateral spaces at each side of the central rib *a*. The projections or studs *e f* on the outer ribs are also raised with respect to the wearing surfaces of the said ribs. In some cases projections or studs on the outer ribs may be arranged closer together than shown and they may be staggered as on the central rib in order to provide irregular walls on both sides of each outer rib.

Fig. 3 is a plan of a similar form of tire tread to that shown in Fig. 1 and Fig. 4 is a cross sectional view on the line 4—4 of Fig. 3. In this modification the projections or studs *g* on the central rib are larger than those in the example shown in Fig. 1 and they extend laterally from both sides of the central rib to the outer ribs on which circular projections *h i* are formed. A larger main wearing surface than in Fig. 1 is thus provided.

In the example illustrated in the plan view shown in Fig. 5 of which Fig. 6 is a cross sectional view on the line 6—6, the projections or studs *j* present approximately semi-circular wearing surfaces, the curved portions of the alternate studs extending laterally in one direction and the curved portions of the intervening projections in the opposite direction. The curved edges of the smaller semi-circular studs *k l* extend laterally from the outer ribs *b c* and are parallel to the curved edges of the larger studs. The irregular walls or edges in this case are obtained without staggering the studs as aforesaid.

Referring to the modification shown in the sectional perspective view Fig. 7 and the plan Fig. 8, the general arrangement of central and outer ribs with raised projections is similar to that shown in Figs. 1 and 2 but instead of employing circular or approximately circular projections, there are provided a series of raised elongated studs or projections *p* which, on the central rib are staggered in the manner aforesaid, while similar but smaller elongated studs *q r* are provided on the outer ribs *b c*.

This invention as set forth in the various modifications hereinbefore described provides a non-slipping and non-skidding tire tread which is comparatively narrow, and yet comprises sufficient rubber or material to render it long wearing. The provision of the projections or studs arranged at a suitable distance apart circumferentially, improves the driving and braking qualities of the tire tread, and the irregular walls or edges of the ribs prevent or minimize the tendency to slip or skid laterally.

In Figs. 9 to 14 the invention is illustrated as applied to tires chiefly intended for motor road vehicles, and the example shown in the cross sectional view Fig. 9 and the plan view Fig. 10, comprises two central ribs *a'* *a'* each having staggered and raised studs or projections *d'* *d'*; the two outer ribs *b c* being similar to the outer ribs shown in Fig. 1. Figs. 11 and 12 are respectively a cross sectional view and a plan of a modification having a central rib *a* as shown in Fig. 1 and outer ribs *b c* which are provided with raised staggered studs *e'* and *f'* respectively. In the example shown in the cross sectional view Fig. 13 and the plan view Fig. 14, the arrangement of central rib *a* and outer ribs *b* and *c* is similar to that shown in Fig. 1, but additional ribs $b^2$ $c^2$ are provided at the outer sides of the ribs *b c*, the said ribs $b^2$ $c^2$ having raised studs $e^2$ $f^2$ respectively which are in alinement but are smaller and disposed closer together than on the ribs *b c*. Generally the number of studs on the central rib is in excess of that on each outer rib in order to provide additional wearing surface at the middle of the tread.

What I claim and desire to secure by Letters Patent of the United States is:—

1. A tire tread comprising in combination, a central or intermediate circumferential rib of substantial cross section, solid projections actually on said rib and raised above the surface thereof and also extending laterally from said rib, one projection extending laterally beyond one side of the rib only and the next projection extending laterally beyond the other side of the rib only and so on around the tire and solid projections on each side of and separate from said rib disposed in or extending into the spaces between the lateral projections on said rib.

2. A tire tread comprising in combination, a central or intermediate circumferential rib of substantial cross section, solid projections actually on said rib and raised above the surface thereof and each extending laterally beyond one side only from said rib, one projection extending laterally from one side of the rib and the next projection extending laterally from the other side of the rib and so on around the tire, a circumferential rib on each side of and smaller in cross section than the said intermediate rib solid projections on said outer and smaller ribs raised above the surface of the latter and extending laterally from the said outer ribs into the spaces between the lateral projections on the intermediate rib.

3. A tire tread comprising in combination a central or intermediate circumferential rib of substantial cross section, solid projections actually on said rib and raised above the surface thereof and also extending laterally from said rib, one projection extending laterally beyond one side of the rib only and the next projection extending laterally beyond the other side of the rib only, and so on around the tire, a circumferential rib on each side and smaller in cross section than the said intermediate rib, and solid projections on said outer and smaller ribs raised above the surface of the latter and extending laterally beyond the opposed or inner edges of said outer ribs into the spaces between the lateral projections on the intermediate rib.

4. A tire tread having a rib, studs or obstructions on said rib which are staggered so that alternate studs project laterally beyond only one side of the rib, while intervening studs project laterally beyond only the other side of the rib.

5. A tire tread having circumferential ribs, projections on each of said ribs raised above the surface of the ribs, the studs on each of said ribs being staggered so that alternate studs project laterally beyond only one side of the rib, while intervening studs project laterally beyond only the other side of the rib.

In testimony whereof I affix my signature in presence of two witnesses.

COLIN MACBETH.

Witnesses:
EDWARD HAROLD DUCK,
CHARLES EDWARDS.